United States Patent [19]
Hallam et al.

[11] Patent Number: 6,143,817
[45] Date of Patent: Nov. 7, 2000

[54] USE OF DERIVATIVES OF POLYAMINO ACIDS AS EMULSIFIERS STABILIZERS IN AQUEOUS FREE RADICAL EMULSION POLYMERIZATION

[75] Inventors: Malcolm Hallam, Branchburg; Grant T. Shouldice, Peapack, both of N.J.; Jacob J. Guth, Upper Black Eddy, Pa.

[73] Assignee: National Starch & Chemical Co., Bridgewater, N.J.

[21] Appl. No.: 09/167,920

[22] Filed: Oct. 7, 1998

[51] Int. Cl.⁷ ........................................ C08L 77/00
[52] U.S. Cl. .......................... 524/514; 524/502; 524/804; 525/421
[58] Field of Search .............................. 525/421; 524/804, 524/502, 514

[56] References Cited

U.S. PATENT DOCUMENTS

| | | |
|---|---|---|
| 4,034,124 | 7/1977 | van Dam . |
| 4,481,185 | 11/1984 | Grollier et al. . |
| 4,959,428 | 9/1990 | Abe et al. . |
| 5,212,235 | 5/1993 | Nestaas et al. . |
| 5,225,474 | 7/1993 | Jon et al. . |
| 5,633,334 | 5/1997 | Walker et al. . |
| 5,652,289 | 7/1997 | Eisenhardt et al. . |
| 5,652,293 | 7/1997 | Eisenhardt et al. . |
| 5,661,103 | 8/1997 | Harms et al. . |
| 5,798,331 | 8/1998 | Anderson et al. . |

FOREIGN PATENT DOCUMENTS 7-238503   9/1995   Japan .

*Primary Examiner*—Edward J. Cain
*Attorney, Agent, or Firm*—Richard R Muccino

[57] ABSTRACT

This invention relates to a stabilized aqueous emulsion polymerization composition comprising (a) from about 10% to about 80% by weight of a polymer derived from an emulsion polymerizable ethylenically unsaturated monomer; (b) from about 0.1% to about 10% by weight of a polyamino acid heteropolymer; (c) from about 0.01% to about 1% by weight of a free radical polymerization initiating agent; and (d) the remainder water. The polyamino acid heteropolymer in (b) may be selected from the group consisting of polyaspartic acid heteropolymers, polyglutamic acid heteropolymers, copolymers of polyaspartic acid heteropolymers with polyglutamic acid heteropolymers, and mixtures thereof. The present invention also pertains to a method for emulsifying and stabilizing an aqueous free radical emulsion polymerization reaction employing the polyamino acid heteropolymers.

27 Claims, 2 Drawing Sheets

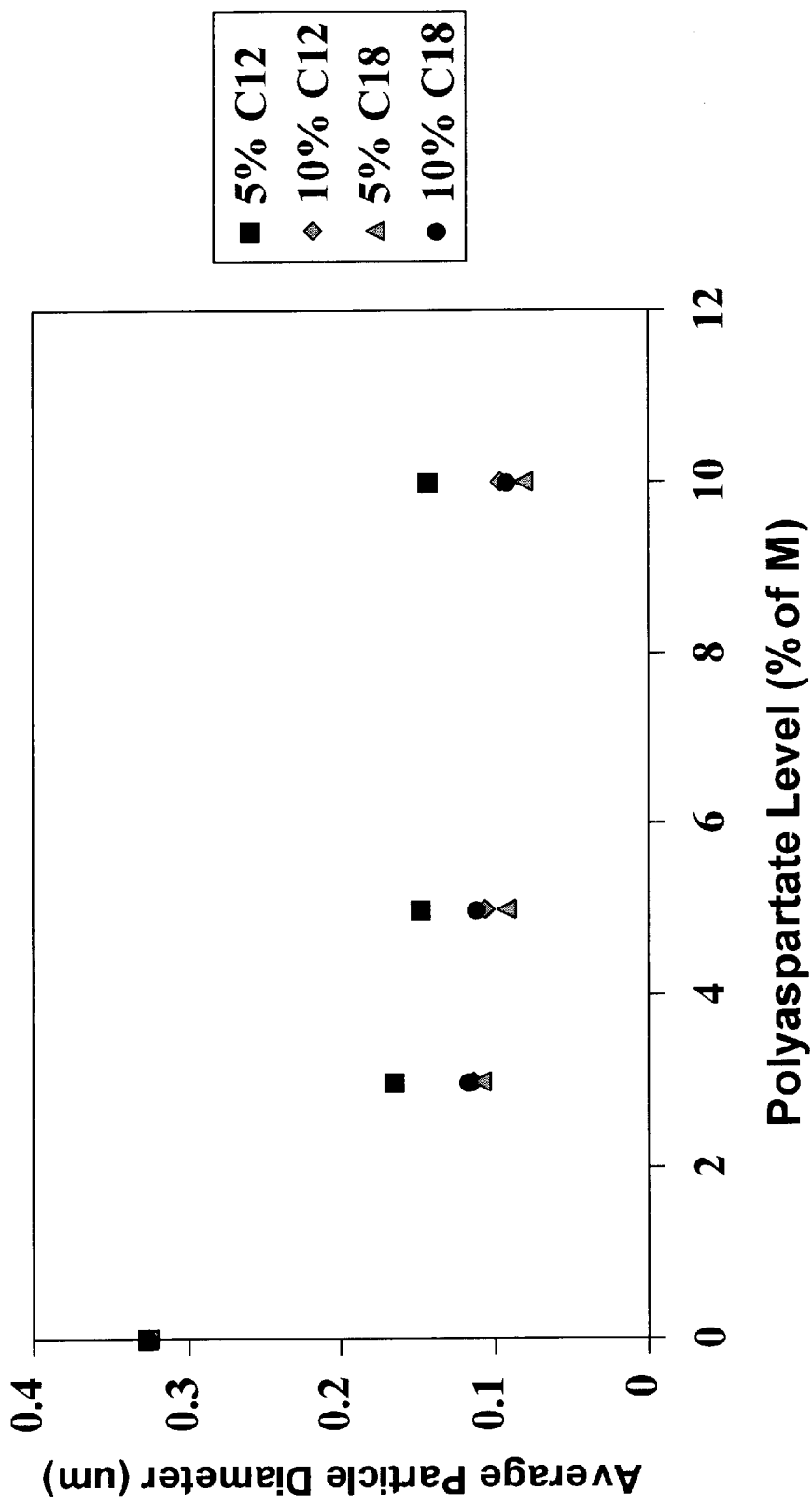

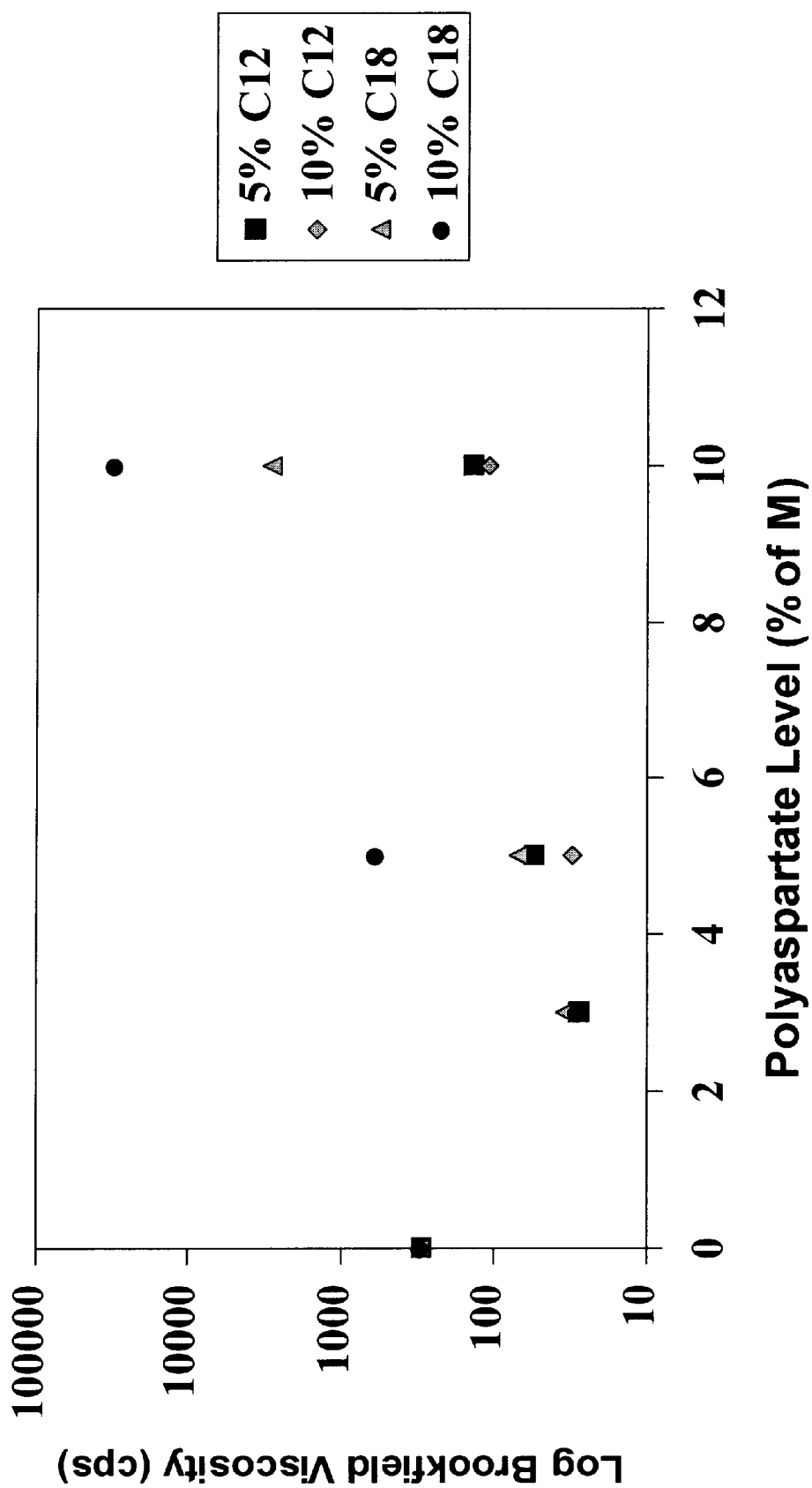

USE OF DERIVATIVES OF POLYAMINO ACIDS AS EMULSIFIERS STABILIZERS IN AQUEOUS FREE RADICAL EMULSION POLYMERIZATION

FIELD OF THE INVENTION

This invention relates to a stabilized aqueous emulsion polymerization composition comprising (a) from about 10% to about 80% by weight of a polymer derived from an emulsion polymerizable ethylenically unsaturated monomer; (b) from about 0.1% to about 10% by weight of a polyamino acid heteropolymer; (c) from about 0.01% to about 1% by weight of a free radical polymerization initiating agent; and (d) the remainder water. The polyamino acid heteropolymer in (b) may be selected from the group consisting of polyaspartic acid heteropolymers, polyglutamic acid heteropolymers, and copolymers of polyaspartic acid heteropolymers with polyglutamic acid heteropolymers. The present invention also pertains to a method for emulsifying and stabilizing an aqueous free radical emulsion polymerization reaction employing the polyamino acid heteropolymers. The present invention also pertains to a method for making a polymer which comprises emulsifying and stabilizing an aqueous free radical emulsion polymerization reaction of ethylenically unsaturated monomers employing the polyamino acid heteropolymers of the present invention.

BACKGROUND OF THE INVENTION

The generation of water borne resins by free radical emulsion polymerization is generally carried out in the presence of a surface active agent (surfactant) which emulsifies the hydrophobic discontinuous phase in the aqueous continuous phase and imparts stability to the final polymer phase. The emulsion polymerization composition may be stabilized electrostatically by low molecular weight anionic, cationic, or non-ionic surface active agents, such as sodium dodecyl benzene sulfonate, or by "in-situ" surface active agents, generated from ionic free radical initiators. The emulsion polymerization composition may also be stabilized sterically by high molecular weight polymeric protective colloids such as polyvinyl alcohol. Surface active agents are integral ingredients in emulsion polymerization reactions which also include, but are not limited to, water, monomer, and a water-soluble free radical initiator. Monomers generally exhibit limited water solubility and surface active agents are required to emulsify water-insoluble monomers to facilitate the reaction between the monomer molecules and the water-soluble free radicals. The newly formed polymeric discontinuous phase must then be stabilized to coagulation by adsorption and/or grafting of a stabilizing species, which function is also generally carried out by the surface active agent.

While surface active or emulsifying properties may be common to emulsion polymerization and a variety of detergent, cosmetic, and industrial applications, it is not expected that a material found useful for one application will be suitable for emulsion polymerization. Conventional methods do not employ poly-amino acid derivatives as emulsifiers or stabilizers in aqueous free radical emulsion polymerization reactions. Many traditional emulsifiers and stabilizers have been disclosed for performing aqueous free radical emulsion polymerization but all have some limitations in terms of the processes and properties of the final product. The present invention provides an improved method for emulsifying and stabilizing an aqueous free radical emulsion polymerization reaction of ethylenically unsaturated monomers without many of the limitations characteristic of previously known methods.

BRIEF DESCRIPTION OF THE FIGURES

FIG. 1 illustrates the influence of the level and type of polyaspartic acid heteropolymer (15,000 MW) emulsifying and stabilizing agent on the final average particle size of the acrylic latex stabilized aqueous emulsion polymerization compositions prepared according to the method of the present invention.

FIG. 2 illustrates the influence of the level and type of polyaspartic acid heteropolymer (15,000 MW) emulsifying and stabilizing agent on the final viscosity of the acrylic latex stabilized aqueous emulsion polymerization compositions prepared according to the method of the present invention.

SUMMARY OF THE INVENTION

This invention relates to the use of derivatives of polyamino acids as emulsifiers and stabilizers in aqueous free radical emulsion polymerization reactions. The polyamino acid derivatives are useful for stabilizing and emulsifying a wide range of ethylenically unsaturated monomers over a wide range of emulsion polymerization processes and provide stabilized aqueous emulsion latex polymerization compositions having unique properties. The novel stabilized aqueous emulsion polymerization compositions comprise (a) from about 10% to about 80% by weight of a polymer derived from an emulsion polymerizable ethylenically unsaturated monomer; (b) from about 0.1% to about 10% by weight of a polyamino acid heteropolymer; (c) from about 0.01% to about 1% by weight of a free radical polymerization initiating agent; and (d) the remainder being water. The polyamino acid heteropolymer in (b) may be selected from the group consisting of polyaspartic acid heteropolymers represented by Formula (1);

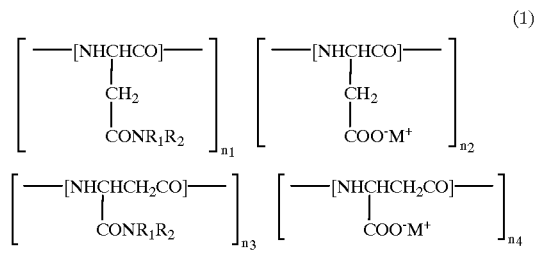

polyglutamic acid heteropolymers represented by Formula (2);

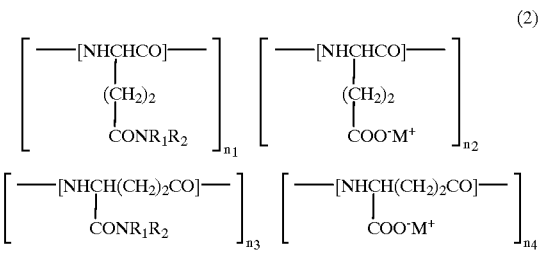

and copolymers of the polyaspartic acid heteropolymers represented by Formula (1) with the polyglutamic acid heteropolymers represented by Formula (2), and mixtures thereof. (i) $R_1$ is selected from the group consisting of branched and unbranched alkyl, alkylaryl, and alkenyl groups having from 4 to 30 carbon atoms, and alkyl terminated polymers of ethylene oxide, propylene oxide, and butylene oxide having a molecular weight in the range from about 200 to about 3000; (ii) $R_2$ is selected from the group consisting of hydrogen and branched and unbranched alkyl and alkenyl groups having from 1 to 4 carbon atoms; (iii) $M^+$ is a cation; (iv) residues $n_1$, $n_2$, $n_3$, and $n_4$ are present in random order, and the ratio of $(n_1+n_3):(n_2+n_4)$ is from about 1:99 to about 1:1; and (v) the molecular weight of the polyamino acid heteropolymer is from about 1,000 to about 100,000.

This invention also pertains to a method for making a polymer which comprises comprises polymerizing from about 10% to about 80%, by weight, of an emulsion polymerizable ethylenically unsaturated monomer in an aqueous medium by free radical initiated polymerization in the presence of (a) from about 0.1% to about 10% by weight of a polyamino acid heteropolymer; and (b) from about 0.01% to about 1% by weight of a free radical polymerization initiating agent; to form a stabilized aqueous emulsion polymerization composition, wherein the polyamino acid heteropolymer in (b) may be selected from the group consisting of polyaspartic acid heteropolymers represented by Formula (1):

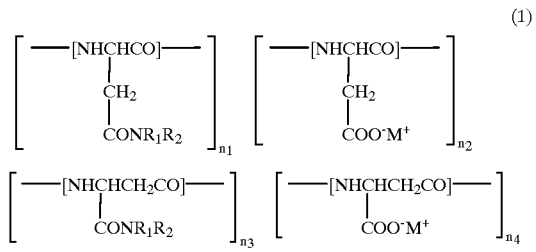

and polyglutamic acid heteropolymers represented by Formula (2):

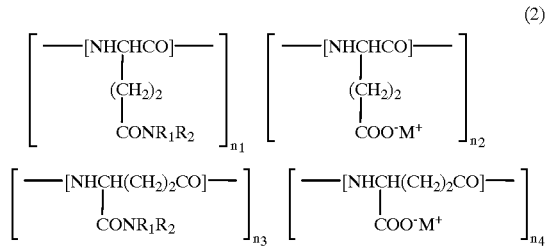

and copolymers of the polyaspartic acid heteropolymers represented by Formula (1) with the polyglutamic acid heteropolymers represented by Formula (2), and mixtures thereof. (i) $R_1$ is selected from the group consisting of branched and unbranched alkyl, alkylaryl, and alkenyl groups having from 4 to 30 carbon atoms, and alkyl terminated polymers of ethylene oxide, propylene oxide, and butylene oxide having a molecular weight in the range from about 200 to about 3000; (ii) $R_2$ is selected from the group consisting of hydrogen and branched and unbranched alkyl and alkenyl groups having from 1 to 4 carbon atoms; (iii) $M^+$ is a cation; (iv) residues $n_1$, $n_2$, $n_3$, and $n_4$ are present in random order, and the ratio of $(n_1+n_3):(n_2+n_4)$ is from about 1:99 to about 1:1; and (v) the molecular weight of the polyamino acid heteropolymer is from about 1,000 to about 100,000.

This invention also pertains to a stabilized aqueous emulsion polymerization composition prepared by the novel method.

DETAILED DESCRIPTION OF THE INVENTION

The present invention relates to the use of polyamino acid derivatives as emulsifiers and stabilizers in the aqueous free radical emulsion polymerization of ethylenically unsaturated monomers. The polyamino acid derivatives are useful for stabilizing and emulsifying a wide range of ethylenically unsaturated monomers over a wide range of emulsion polymerization processes and provide latex polymers having unique properties. The polyamino acid derivatives may be utilized by themselves, or may be used in conjunction with anionic, cationic, or non-ionic surfactants, or protective colloidal stabilizers, to stabilize the emulsion polymerization of ethylenically unsaturated monomers. The polymerized resins are prepared by dispersing the ethylenically unsaturated monomer into an aqueous continuous phase containing a polyamino acid derivative, followed by slowly adding a free radical initiator and optionally buffer, salts, or functionalized monomers to generate the waterborne polymer. The polyamino acid derivatives are highly efficient stabilizers and provide clean, stable resins with viscosities ranging from about 30 cps to about 30,000 cps at a relatively high solids content and characterized by unexpectedly small average particle sizes. By employing the polyamino acid derivatives of the present invention, polymeric resin dispersions can be prepared with the desired rheological properties using a variety of known emulsion polymerization processes while maintaining other advantageous latex properties including, but not limited to, latent reactive particle surface functionality, low toxicity, biodegradability, and buffer capacity. The general process of emulsion polymerization, which may be enhanced by the use of the polyamino acid derivatives of the present invention, has broad utility in terms of the ethylenically unsaturated monomers which may be employed, the polymeric properties which may be achieved, and the range of applications which can be served. Such applications include, but are not limited to adhesives, coatings, binders, fixatives, re-dispersible powders, and sizes for use in glass, paper, and textile applications as well as personal care products. Small amounts of the polyamino acid derivative, e.g., 1.4 part per hundred of monomer (pphm), have been found to provide vinyl acetate/di-butyl maleate latex emulsion polymers having a solids content on the order of 42%. Stable vinyl acetate and acrylic based latexes having a solids content on the order of 50%, an average particle size on the order of 0.1 μm, and viscosities ranging from 30 cps to about 30,000 cps have also been prepared. Use of increasing levels of the polyamino acid derivatives results in increasing levels in resin viscosity so that the polyamino acid derivatives may be used both as a stabilizer and as a thickener.

The polyamino acid derivatives may be obtained by reacting the polyamino acids, or their corresponding acid chloride or anhydride derivatives, with the desired amount of primary or secondary amine. For example, polyaspartic acid derivatives may be obtained by reacting the polyaminopoly(succinimide) with the desired amount of primary or secondary amine followed by the subsequent hydrolysis of the remaining succinimide groups. A surprisingly broad range of latex rheology can be directly controlled by the type and amount of amine used to derivatize the polyamino acid polymer. The polyamino acid derivatives are characterized by molecular weights in the range about 1,000 to about 100,000 (compared against polyacrylate standards). The polyamino acid derivatives are unique polyelectrolytes which impart stabilization through a complex combination of both electrostatic and steric mechanisms. The polyamino acid derivatives provide small final particle sizes, viscosity control, latent reactive functionality potential, large solids content to amount of stabilizer ratio, low toxicity, biodegradability, and buffer capacity.

As set out above, the present invention is directed to a stabilized aqueous emulsion polymerization composition comprising (a) from about 10% to about 80% by weight of a polymer derived from an emulsion polymerizable ethylenically unsaturated monomer; (b) from about 0.1% to about 10% by weight of a polyamino acid heteropolymer; (c) from about 0.01% to about 1% by weight of a free radical polymerization initiating agent; and (d) the remainder being water.

The stabilized aqueous emulsion polymerization compositions of the present invention are prepared by polymerizing ethylenically unsaturated monomers in aqueous medium, initiated by a free radical initiating agent, in the presence of the novel polyamino acid heteropolymer emulsifying and stabilizing agents according to known aqueous emulsion polymerization techniques. The ethylenically unsaturated monomer, emulsifying and stabilizing agent, and free radical polymerization initiating agent may each be separately introduced into the aqueous medium to form a reaction mixture; or the initiator may be added to the aqueous medium at a controlled rate as the polymerization progresses; or the monomers to be polymerized may be added to the aqueous medium at a controlled rate as the polymerization reaction progresses, or monomer and initiator may be added to the aqueous medium and polymerized to form seed particles to which further amounts of monomer, initiator, and optionally a stabilizing agent may be added at a controlled rate as the polymerization progresses; or to an existing dispersion of stable latex particles, monomer, initiator, and optionally a stabilizing agent may be added at a controlled rate as the polymerization progresses. A buffering agent, such as sodium acetate or ammonium hydroxide, may optionally be included in the emulsion polymerization composition reaction mixture.

Suitable polymerizable ethylenically unsaturated monomers in (a) include vinyl ester monomers such as vinyl acetate, vinyl propionate, vinyl neononanoate, vinyl neodecancate, vinyl 2-ethylhexanoate, vinyl pivalate, vinyl versatate, and mixtures thereof. Other suitable polymerizable ethylenically unsaturated monomers include alkyl (meth)acrylate monomers including methyl acrylate, ethyl acrylate, butyl acrylate, 2-ethylhexyl acrylate, lauryl acrylate, methyl methacrylate, ethyl methacrylate, butyl methacrylate, isodecyl methacrylate, lauryl methacrylate, and mixtures thereof. Other suitable polymerizable ethylenically unsaturated monomers include monoethylenically unsaturated carboxylic acid monomers including acrylic acid, methacrylic acid, itaconic acid, crotonoic acid, fumaric acid, maleic anhydride, and mixtures thereof. Other suitable polymerizable ethylenically unsaturated monomers include styrene, butadiene, acrylonitrile, acrylamide, n-methylolacrylamide, di-butyl maleate, ethylene, vinyl chloride, and mixtures thereof.

Preferred ethylenically unsaturated monomers include styrene, butadiene, vinyl acetate, methyl acrylate, methyl methacrylate, ethyl acrylate, butyl acrylate, 2-ethylhexyl acrylate, vinyl chloride, acrylonitrile, acrylamide, t-octyl acrylamide, n-vinylformamide, n-vinyl acetamide, n-vinyl pyrrolidone, di-butyl maleate, ethylene, and mixtures thereof. More preferred ethylenically unsaturated monomers include methyl methacrylate, butyl acrylate, vinyl acetate, di-butyl maleate, ethylene, and mixtures thereof.

The amount of polymer derived from an emulsion polymerizable ethylenically unsaturated monomer present in the aqueous stabilized emulsion polymerization composition may vary depending upon the particular composition of ethylenically unsaturated monomers employed and the polymerization reaction conditions desired. In general, the amount of polymer derived from an emulsion polymerizable ethylenically unsaturated monomer employed will be an amount effective to obtain the desired polymerization composition. In a preferred embodiment, the polymer derived from an emulsion polymerizable ethylenically unsaturated monomer in the aqueous stabilized emulsion polymerization composition is present in an amount from about 10% to about 80%, preferably from about 25% to about 75%, and more preferably from about 40% to about 75%, by weight.

The emulsifying and stabilizing agent in (b) is a polyamino acid heteropolymer which may be selected from the group consisting of polyaspartic acid heteropolymers represented by Formula (1);

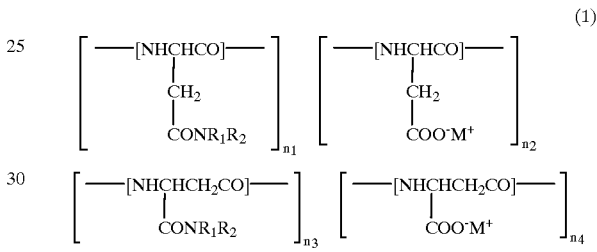

polyglutamic acid heteropolymers represented by Formula (2);

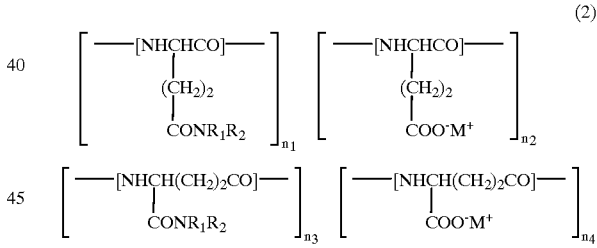

and copolymers of the polyaspartic acid heteropolymers represented by Formula (1) with the polyglutamic acid heteropolymers represented by Formula (2), and mixtures thereof.

In Formula (1) and (2), $R_1$ is selected from the group consisting of branched and unbranched alkyl, alkylaryl, and alkenyl groups having from 4 to 30 carbon atoms, and alkyl terminated polymers of ethylene oxide, propylene oxide, and butylene oxide having a molecular weight in the range from about 200 to about 3000. Preferred alkyl terminated polymers of ethylene oxide, propylene oxide, and butylene oxide having a molecular weight in the range from about 200 to about 3000 are the ethoxylated amines known as Jeffamines®, Huntsman Corporation. Preferably, $R_1$ is a branched or unbranched alkyl, alkylaryl, or alkenyl group having from 8 to 26 carbon atoms, and more preferably $R_1$ is a branched or unbranched alkyl, alkylaryl, or alkenyl group having from 8 to 20 carbon atoms. Most preferably, $R_1$ is $-C_8H_{17}$, $-C_{12}H_{25}$, or $-C_{18}H_{37}$.

In Formula (1) and (2), $R_2$ is selected from the group consisting of hydrogen and branched and unbranched alkyl and alkenyl groups having from 1 to 4 carbon atoms.

Residues $n_1$, $n_2$, $n_3$, and $n_4$ in Formula (1) and (2) are present in random order. The ratio of $(n_1+n_3):(n_2+n_4)$, i.e., the ratio of the hydrophobic moieties to the carboxylic acid moieties, respectively, is from about 1:99 to about 1:1, preferably from about 1:50 to about 1:4, and more preferably from about 1:20 to about 1:8.

The selection of $R_1$ and $R_2$ will determine the hydrophilic and hydrophobic character of the polyamino acid heteropolymer. Effective emulsion stabilizers are molecules which possess both hydrophilic and hydrophobic character. In general, the hydrophobic moieties tend to associate in solution, whereas the hydrophilic moieties interact strongly with water which facilitates the emulsification of water-insoluble monomers. Hydrophobic moieties tend to adsorb onto the hydrophobic polymer particles thereby anchoring the hydrophilic groups which impart stabilization to the particle. The amount and type of hydrophobic moieties influences the emulsification process, the anchoring ability of the stabilizing species, and the final latex viscosity. In general, the preferred amounts and types of hydrophobic moieties are those which provide effective anchoring as well as the desired final latex viscosity. The preferred amounts of hydrophobic moieties incorporated into the backbone of the polyamino acid heteropolymer range from about 5% to about 20%, on a mole basis. The preferred types of hydrophobic moieties incorporated into the backbone of the polyamino acid heteropolymer include branched and unbranched alkyl, alkylaryl, and alkenyl groups having from 8 to 26 carbon atoms and block copolymers of ethylene oxide and propylene oxide of various molecular weights.

$M^+$ in Formula (1) and (2) is a cation to neutralize the carboxiate anion, and may be monovalent or divalent. Non-limiting examples of suitable cations may be selected from the group consisting of $H^+$, $NH_4^+$, alkali metals, alkaline earth metals, $Zn^{2+}$, $Cu^{2+}$, quaternary organic amines, and basic amino acids. Suitable alkali metals include lithium, sodium, and potassium. Suitable alkaline earth metals include magnesium and calcium. Preferably, $M^+$ is $H^+$ or $Na^+$.

The molecular weight of the polyamino acid heteropolymer in Formula (1) and (2) is from about 1,000 to about 100,000., preferably from about 5,000 to about 60,000, and more preferably from about 5,000 to about 30,000.

The amount of polyamino acid heteropolymer present in the aqueous stabilized emulsion polymerization composition of ethylenically unsaturated monomers may vary depending upon the particular polyamino acid heteropolymer employed, the particular composition of ethylenically unsaturated monomers employed, the polymerization reaction conditions desired as well as the resulting resin control, particle size, and viscosity desired. In general, the amount of polyamino acid heteropolymer employed will be an amount effective to emulsify and stabilize the polymerization composition of ethylenically unsaturated monomers. In a preferred embodiment, the polyamino acid heteropolymer in the aqueous stabilized emulsion polymerization composition is present in an amount from about 0.1% to about 10%, preferably from about 0.2% to about 5%, and more preferably from about 0.5% to about 5%, by weight.

The polyamino acid heteropolymers of the present invention can be prepared by various methods. In general, the desired polyamino acid heteropolymers represented by Formula (1) and (2) can be prepared by reacting poly(succinimide) with a desired amount of primary or secondary amine and then hydrolyzing the remaining succinimide groups.

The free radical polymerization initiating agent in (c) initiates the free radical emulsion polymerization reaction. Suitable free radical polymerization initiating agents include those well known in the an including, but not limited to, peroxides, hydroperoxides, persulfates, and azo initiators such as hydrogen peroxide, benzoyl peroxide, tert-butyl hydroperoxide, cumene peroxide, tert-butyl perbenzoate, ter-butyl diperphthalate, methyl ethyl ketone peroxide, ammonium persulfate, sodium persulfate, potassium persulfate, azodusobutyronitrile, and mixtures thereof, as well as cerium, manganese, and vanadium catalyzed systems and also other systems such as those catalyzed by irradiation. Thermal conditions or redox conditions using a redugtant, such as sodium sulphoxylate formaldehyde, isoascorbic acid, or sodium bisulfite, may be used to promote decomposition of the free radical initiating agent. The initiating agent may also be an irradiation source suitable for initiation of free radical polymerization.

The amount of free radical polymerization initiating agent present in the aqueous stabilized emulsion polymerization composition may vary depending upon the particular composition of ethylenically unsaturated monomers employed and the polymerization reaction conditions desired. In general, the amount of free radical polymerization initiating agent will be an amount effective to obtain the desired polymerization composition. In a preferred embodiment, the free radical polymerization initiating agent in the aqueous stabilized emulsion polymerization composition is present in an amount from about 0.01% to about 1%, preferably from about 0.02% to about 0.5%, and more preferably from about 0.05% to about 0.3%, by weight.

The present invention is also directed to a method for making a polymer which comprises polymerizing from about 10% to about 80%, by weight, of an emulsion polymerizable ethylenically unsaturated monomer in an aqueous medium by free radical initiated polymerization in the presence of:

(a) from about 0.1% to about 10% by weight of a polyamino acid heteropolymer; and (b) from about 0.01% to about 1% by weight of a free radical polymerization initiating agent;

to form a stabilized aqueous emulsion polymerization composition, wherein the polyamino acid heteropolymer in (b) may be selected from the group consisting of polyaspartic acid heteropolymers represented by Formula (1):

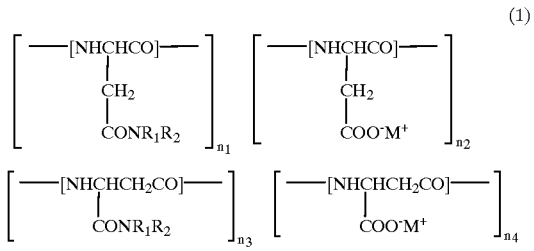

and polyglutamic acid heteropolymers represented by Formula (2):

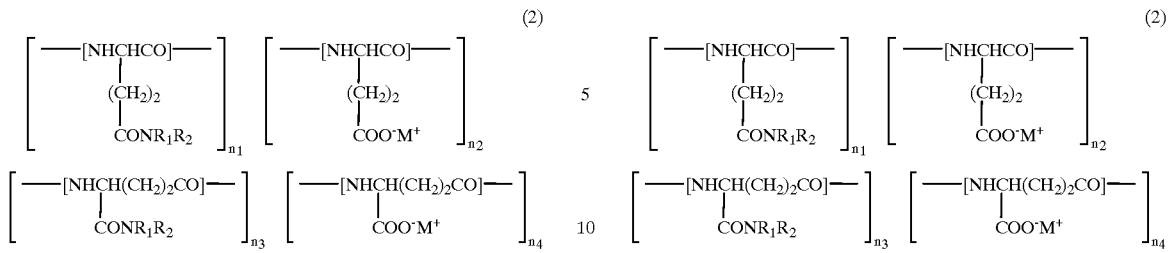

and copolymers of the polyaspartic acid heteropolymers represented by Formula (1) with the polyglutamic acid heteropolymers represented by Formula (2), and mixtures thereof;

wherein (i) $R_1$ is selected from the group consisting of branched and unbranched alkyl, alkylaryl, and alkenyl groups having from 4 to 30 carbon atoms, and alkyl terminated polymers of ethylene oxide, propylene oxide, and butylene oxide having a molecular weight in the range from about 200 to about 3000;

(ii) $R_2$ is selected from the group consisting of hydrogen and branched and unbranched alkyl and alkenyl groups having from 1 to 4 carbon atoms;

(iii) $M^+$ is a cation;

(iv) residues $n_1$, $n_2$, $n_3$, and $n_4$ are present in random order, and the ratio of $(n_1+n_3):(n_2+n_4)$ is from about 1:99 to about 1:1; and (v) the molecular weight of the polyamino acid heteropolymer is from about 1,000 to about 100,000.

As set out above, the stabilized aqueous emulsion polymerization compositions are prepared by polymerizing ethylenically unsaturated monomers in aqueous medium, initiated by a free radical initiating agent, in the presence of the novel polyamino acid heteropolymer emulsifying and stabilizing agents of the present invention according to known aqueous emulsion polymerization techniques.

The present invention is also directed to a stabilized aqueous emulsion polymerization composition prepared by a method which comprises polymerizing from about 10% to about 80%, by weight, of an emulsion polymerizable ethylenically unsaturated monomer in an aqueous medium by free radical initiated polymerization in the presence of:

(a) from about 0.1% to about 10% by weight of a polyamino acid heteropolymer; and (b) from about 0.01% to about 1% by weight of a free radical polymerization initiating agent;

to form a stabilized aqueous emulsion polymerization composition, wherein the polyamino acid heteropolymer in (b) may be selected from the group consisting of polyaspartic acid heteropolymers represented by Formula (1):

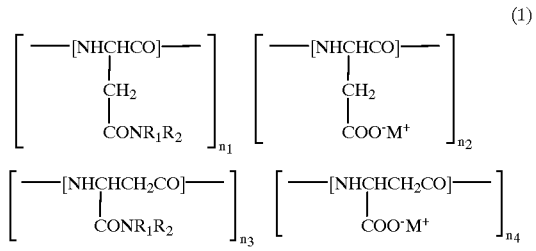

and polyglutamic acid heteropolymers represented by Formula (2):

and copolymers of the polyaspartic acid heteropolymers represented by Formula (1) with the polyglutamic acid heteropolymers represented by Formula (2), and mixtures thereof;

wherein (i) $R_1$ is selected from the group consisting of branched and unbranched alkyl, alkylaryl, and alkenyl groups having from 4 to 30 carbon atoms, and alkyl terminated polymers of ethylene oxide, propylene oxide, and butylene oxide having a molecular weight in the range from about 200 to about 3000;

(ii) $R_2$ is selected from the group consisting of hydrogen and branched and unbranched alkyl and alkenyl groups having from 1 to 4 carbon atoms;

(iii) $M^+$ is a cation;

(iv) residues $n_1$, $n_2$, $n_3$, and $n_4$ are present in random order, and the ratio of $(n_1+n_3):(n_2+n_4)$ is from about 1:99 to about 1:1; and (v) the molecular weight of the polyamino acid heteropolymer is from about 1,000 to about 100,000.

Throughout this application, various publications have been referenced. The disclosures in these publications are incorporated herein by reference in order to more fully describe the state of the art.

The present invention is further illustrated by the following examples which are presented for purposes of demonstrating, but not limiting, the preparation of the compounds and compositions of this invention.

EXAMPLE 1

Preparation of a Polyaspartic Acid Heteropolymer of the Present Invention

Modification of Polysuccinimide with 5 Mole % Dodecylamine

This representative example illustrates the preparation of a polysuccinimide derivative in which 5 mole % of the succinimide residues have been condensed with dodecylamine.

A 3 l, four-neck round bottom flask was equipped with a nitrogen inlet-topped reflux condenser, thermometer, stopper, and mechanical stirrer. To this vessel was charged 2250 g of sulfolane and 250 g (2.58 mole succinimide units) of polysuccinimide powder, 30,000 molecular weight. The reaction vessel was placed under a positive pressure of nitrogen and maintained under nitrogen until the reaction was finished. The resulting suspension was brought to 100° C. with stirring at which temperature the polysuccinimide slowly dissolved. After the polysuccinimide had completely dissolved, the reaction mixture was cooled to about 60° C. At this point 23.91 g (0.129 mole) dodecylamine was added to the reaction mixture in one portion. The resulting mixture was heated to 140° C. with stirring. A clear solution was obtained, and the progress of the reaction was followed by titrating aliquots of the reaction mixture for amine. After 6.5 hr, at least 85% of the starting amine had been consumed. After an additional 24 hours at 140° C. during which there was no further decrease in the level of residual amine, the reaction was cooled to room temperature. The cooled, caramel-colored solution was slowly poured into 3 l of water with vigorous stirring. The light tan solid that precipitated upon addition of the reaction mixture to water was collected by vacuum filtration. It was dried in a forced air oven to a constant weight at 80° C. The yield of product was 300 g. The level of modification with dodecylamine was found to be 5 mole % by proton NMR. Residual sulfolane in the product was found to be 0.95% by gas chromatography.

Preparation of Poly(Aspartic Acid, Sodium Salt) Modified with 5 Mole % Dodecylamine This representive example illustrates the hydrolysis of polysuccinimide modified with 5 mole % dodecylamine to the corresponding poly(aspartic acid, sodium salt) derivative.

A 3 l flask was equipped with a thermometer, reflux condenser, and 20 mechanical stirrer. To the flask was charged, 1005 g of de-ionized water and 292 g of polysuccinimide modified with 5 mole % dodecylamine. The resulting suspension was warmed to 90° C., and a slow addition of 4.2 N NaOH was commenced. The rate of addition was controlled by a Brinkmann 718 STAT Titrino such that the pH of the reaction mixture was maintained at 7.5±0.25. After the addition of 484 ml of 4.2 N NaOH, a clear solution was obtained. The reaction mixture was cooled, and filtered to remove any remaining insoluble particles. The filtrate thus obtained was then extracted with ethyl acetate using a continuous liquid/liquid extractor until the level of residual sulfolane (from the polysuccinimide modification reaction) in the filtrate was less than 50 ppm. Ethyl acetate was distilled from the extracted product solution under reduced pressure using a rotary evaporator. The extracted, ethyl acetate-free product solution was then freeze-dried. The yield of tan solid was 314.3 g. The proton NMR of the isolated product was measured and found to be consistent with expectations. The level of residual sulfolane was found to be ≦60 ppm by gas chromatography.

EMULSION EXAMPLE 1

An Emulsion Polymerization Process for Methyl Methacrylate and Butyl Acrylate in Which the Sole Stabilizer is a 5,000 MW, 10% C12 Polyaspartic Acid Heteropolymer This example illustrates the preparation of stabilized aqueous emulsion polymerization compositions prepared according to the method of the present invention employing polyaspartic acid heteropolymers as emulsifying and stabilizing agents. Polymerization was carried out using a semi-batchwise addition of 15 pphm of Methyl Methacrylate/Butyl Acrylate (MMA/BA) and a slow add feed of the remaining monomer, initiator, and buffer.

| Ingredient | Part per Hundred Monomer |
| --- | --- |
| Water | |
| Polyaspartic Acid, 5k, 10%, R = $C_{12}$* | 1 |
| Methyl Methacrylate | 43 |
| Butyl Acrylate | 57 |
| Ammonium Persulphate | 0.4 |
| Ammonium Hydroxide (10% solution) | 0.25 |

Theoretical Solids Content = 36.9%
*$C_{12}$ refers to —$C_{12}H_{25}$.

This example generated a stabilized aqueous emulsion polymerization composition characterized by a 34.7% solids content;-Brookfield viscosity of 18 cps and average final particle size of 0.093 μm.

EMULSION EXAMPLE 2

An Emulsion Polymerization Process for Methyl Methacrylate and Butyl Acrylate in which the Sole Stabilizer is a 15,000 MW, 10% C18 Polyaspartic Acid Heteropolymer This example illustrates the preparation of stabilized aqueous emulsion polymerization compositions prepared according to the method of the present invention employing polyaspartic acid heteropolymers as emulsifying and stabilizing agents. Polymerization was carried out using a semi-batchwise addition of 15 pphm of Methyl Methacrylate/Butyl Acrylate (MMA/BA) and a slow add feed of the remaining monomer, initiator, and buffer.

Polyaspartic Acid Derivative Stabilized Emulsion Co-polymerization of Methyl Methacrylate and Butyl Acrylate

| Ingredient | Part per Hundred Monomer |
| --- | --- |
| Water | |
| Polyaspartic Acid, 10%, R = $C_{18}$* | 10 |
| Methyl Methacrylate | 43 |
| Butyl Acrylate | 57 |
| Ammonium Persulphate | 0.4 |
| Ammonium Hydroxide (10% solution) | 0.25 |

Theoretical Solids Content = 38.9%
*$C_{18}$ refers to —$C_{18}H_{37}$.

This example method generated a stabilized aqueous emulsion polymerization composition characterized by a 38.6% solids content, Brookfield viscosity of 30,000 cps, and average final particle size of 0.141 μm.

EMULSION EXAMPLE 3

An Emulsion Polymerization Process for Methyl Methacrylate and Butyl Acrylate in which the Sole Stabilizer is a 30,000 MW, 5% C12 Polyaspartic Acid Heteropolymer This example illustrates the preparation of stabilized aqueous emulsion polymerization compositions prepared according to the method of the present invention employing polyaspartic acid heteropolymers as emulsifying and stabilizing agents. Polymerization was carried out using a semi-batchwise addition of 15 pphm of Methyl Methacrylate/Butyl Acrylate (MMA/BA) and a slow add feed of the remaining monomer, initiator, and buffer.

| Ingredient | Part per Hundred Monomer |
|---|---|
| Water | |
| Polyaspartic Acid, 30k, 5%, R = $C_{12}$* | 2.5 |
| Methyl Methacrylate | 43 |
| Butyl Acrylate | 57 |
| Ammonium Persulphate | 0.4 |
| Ammonium Hydroxide (10% solution) | 0.25 |

Theoretical Solids Content = 35.3%
*$C_{12}$ refers to —$C_{12}H_{25}$.

This example generated a stabilized aqueous emulsion polymerization composition characterized by a 34.1% solids content, Brookfield viscosity of 20 cps, and average final particle size of 0.141 μm.

EMULSION EXAMPLE 4

An Emulsion Polymerization Process for Methyl Methacrylate, Butyl Acrylate, and Methacrylic Acid in which the Sole Stabilizer is a 30,000 MW, 10% $C_{12}$ Polyaspartic Acid Heteropolymer This example illustrates the preparation of stabilized aqueous emulsion polymerization compositions prepared according to the method of the present invention employing polyaspartic acid heteropolymers as emulsifying and stabilizing agents. Polymerization was carried out using a slow addition of Methyl Methacrylate/Butyl Acrylate/Methacrylic Acid ([MMA/BA/AA-polyAspartate] emulsion. The initiator was also slow added concomitantly.

| Ingredient | Part per Hundred Monomer |
|---|---|
| Water | |
| Polyaspartic Acid, 30k, 10%, R = $C_{12}$* | 4 |
| Methyl Methacrylate | 43.5 |
| Butyl Acrylate | 43.5 |
| Methacrylic Acid | 13 |
| Ammonium Persulphate | 0.4 |
| Ammonium Hydroxide (10% solution) | 0.25 |

Theoretical Solids Content = 50.5%
*$C_{12}$ refers to —$C_{12}H_{25}$.

This example generated a stabilized aqueous emulsion polymerization composition characterized by a 52.8% solids content, Brookfield viscosity of 42 cps, and average final particle size of 0.249 μm.

FIG. 1 illustrates the influence of the level and type of polyaspartic acid heteropolymer (15,000 MW) emulsifying and stabilizing agent on the final average particle size of the acrylic latex stabilized aqueous emulsion polymerization compositions prepared according to the method of the present invention. FIG. 2 illustrates the influence of the level and type of polyaspartic acid heteropolymer (15,000 MW) emulsifying and stabilizing agent on the final viscosity of the acrylic latex stabilized aqueous emulsion polymerization compositions prepared according to the method of the present invention. In FIGS. 1 and 2, $C_{12}$ refers to —$C_{12}H_{25}$ and $C_{18}$ refers to —$C_{18}H_{37}$. While the average particle size remained in the 0.1 μm to 0.2 μm range at all levels of polyaspartic acid heteropolymer, the viscosity of the latexes increased as the level of polyaspartic acid heteropolymer increased. The ability to control the viscosity of the latex while maintaining a relatively small particle size by adjusting the level of polyaspartic acid heteropolymer is apparent.

EMULSION EXAMPLE 5

An Emulsion Polymerization Process for Vinyl Acetate in which the Sole Stabilizer is a 15,000 MW, 5% C12 Polyaspartic Acid Heteropolymer This example illustrates the preparation of stabilized aqueous emulsion polymerization compositions prepared according to the method of the present invention employing polyaspartic acid heteropolymers as emulsifying and stabilizing agents. Polymerization was carried out using a semi-batchwise addition of 15 pphm monomer and a slow add feed of the remaining monomer, oxidizing, and reducing agents.

Polyaspartic Acid Derivative Stabilized Emulsion Polymerization of Vinyl Acetate

| Ingredient | Part per Hundred Monomer |
|---|---|
| Water | |
| Polyaspartic Acid, 5% R = $C_{12}$* | 4.0 |
| Vinyl Acetate | 100 |
| Ammonium Persulphate | 0.2 |
| Sodium Formaldehyde Sulfoxylate | 0.15 |

Theoretical Solids Content = 50.1%
*$C_{12}$ refers to —$C_{12}H_{25}$.

This example generated a stabilized aqueous emulsion polymerization composition characterized by a 50.8% solids content, Brookfield viscosity of 339 cps, average final particle size of 0.160 μm, and a vinyl acetate residual monomer content of 5867 ppm.

EMULSION EXAMPLE 6

An Emulsion Polymerization Process for Vinyl Acetate and Di-butyl Maleate in which the Sole Stabilizer is a 5,000 MW, 5% C18 Polyaspartic Acid Heteropolymer This example illustrates the preparation of stabilized aqueous emulsion polymerization compositions prepared according to the method of the present invention employing polyaspartic acid heteropolymers as emulsifying and stabilizing agents. Polymerization was carried out using a batchwise addition of monomer and slow add feed of oxidizing and reducing agents.

Polyaspartic Acid Derivative Stabilized Emulsion Co-polymerization of Vinyl Acetate and Di-butyl Maleate

| Ingredient | Part per Hundred Monomer |
|---|---|
| Water | |
| Polyaspartic Acid, 5k, 5% R = $C_{18}$* | 5 |
| Vinyl Acetate | 79.5 |
| Di-Butyl Maleate | 20.5 |
| t-Butyl Hydroperoxide | 0.26 |
| Sodium Formaldehyde Sulfoxylate | 0.45 |
| Sodium Acetate | 0.05 |

Theoretical Solids Content = 45.5%
*$C_{18}$ refers to —$C_{18}H_{37}$.

This example generated a stabilized aqueous emulsion polymerization composition characterized by a 45.4% solids content, Brookfield viscosity of 4200 cps, average final particle size of 0.086 μm, and a vinyl acetate residual monomer content of 727 ppm.

EMULSION EXAMPLE 7

An Emulsion Polymerization Process for Vinyl Acetate and Di-butyl Maleate in which the Sole Stabilizer is a 15,000 MW, 5% C18 Polyaspartic Acid Heteropolymer This example illustrates the preparation of stabilized aqueous emulsion polymerization compositions prepared according to the method of the present invention employing polyaspartic acid heteropolymers as emulsifying and stabilizing agents. Polymerization was carried out using a batchwise addition of monomer and slow add feed of oxidizing and reducing agents.

| Ingredient | Part per Hundred Monomer |
|---|---|
| Water | |
| Polyaspartic Acid, 5% R = $C_{18}$* | 1.4 |
| Vinyl Acetate | 79.5 |
| Di-Butyl Maleate | 20.5 |
| t-Butyl Hydroperoxide | 0.26 |
| Sodium Formaldehyde Sulfoxylate | 0.45 |
| Sodium Acetate | 0.05 |

Theoretical Solids Content = 44.2%
*$C_{18}$ refers to —$C_{18}H_{37}$.

This example generated a stabilized aqueous emulsion polymerization composition characterized by a 42.2% solids content, Brookfield viscosity of 26 cps, average final particle size of 0.135 μm, and a vinyl acetate residual monomer content of 730 ppm.

EMULSION EXAMPLE 8

An Emulsion Polymerization Process for Vinyl Acetate and Di-butyl Maleate in which the Sole Stabilizer is a 30,000 MW, 5% C12 Polyaspartic Acid Heteropolymer This example illustrates the preparation of stabilized aqueous emulsion polymerization compositions prepared according to the method of the present invention employing polyaspartic acid heteropolymers as emulsifying and stabilizing agents. Polymerization was carried out using a batchwise addition of monomer and slow add feed of oxidizing and reducing agents.

| Ingredient | Part per Hundred Monomer |
|---|---|
| Water | |
| Polyaspartic Acid, 30k, 5% R = $C_{12}$* | 5 |
| Vinyl Acetate | 79.5 |
| Di-Butyl Maleate | 20.5 |
| t-Butyl Hydroperoxide | 0.26 |
| Sodium Formaldehyde Sulfoxylate | 0.45 |
| Sodium Acetate | 0.05 |

Theoretical Solids Content = 45.1%
*$C_{12}$ refers to —$C_{12}H_{25}$.

This example generated a stabilized aqueous emulsion polymerization composition characterized by a 44.6% solids content, Brookfield viscosity of 2560 cps, average final particle size of 0.134 μm, and a vinyl acetate residual monomer content of 165 ppm.

This viscosity effect was also observed for latexes of vinyl-acetateldi-butyl maleate. Table 1 summarizes the influence of type and level of polyaspartic acid heteropolymer on average particle size and Brookfield viscosity.

TABLE 1

Influence of the Level and Type of Polyaspartic acid Heteropolymer on the final Viscosity and Average Particle Size of Vinyl Acetate/Di-butyl Maleate Latexes

| PolyAspartate Type | PolyAspartate Level (% of M) | Average Particle Size (μm) | Brookfield Viscosity (cps) | Solid Content (% w/w) |
|---|---|---|---|---|
| 5% $C_{18}$* | 1.4 | 0.135 | 26 | 42 |
| 5% $C_{18}$* | 4.0 | 0.093 | 105 | 42 |
| 10% $C_{18}$* | 1.4 | 0.125 | 39 | 42 |
| 10% $C_{18}$* | 4.0 | 0.096 | 1370 | 44 |

*$C_{18}$ refers to —$C_{18}H_{37}$.

While a number of embodiments of this invention have been represented, it is apparent that the basic construction can be altered to provide other embodiments which utilize the invention without departing from the spirit and scope of the invention. All such modifications and variations are intended to be included within the scope of the invention as defined in the appended claims rather than the specific embodiments which have been presented by way of example.

We claim:

1. A stabilized aqueous emulsion polymerization composition comprising:

(a) from about 10% to about 80% by weight of a polymer derived from an emulsion polymerizable ethylenically unsaturated monomer;

(b) from about 0.1% to about 10% by weight of a polyamino acid heteropolymer;

(c) from about 0.01% to about 1% by weight of a free radical polymerization initiating agent; and (d) the remainder being water;

wherein the polyamino acid heteropolymer in (b) may be selected from the group consisting of polyaspartic acid heteropolymers represented by Formula (1);

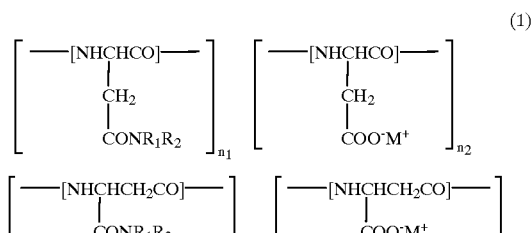

polyglutamic acid heteropolymers represented by Formula (2);

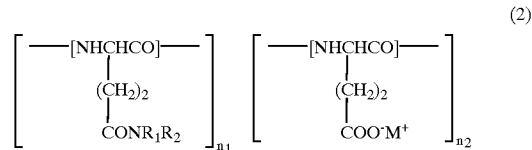

-continued

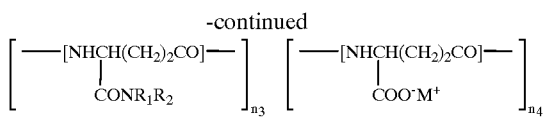

and copolymers of the polyaspartic acid heteropolymers represented by Formula (1) with the polyglutamic acid heteropolymers represented by Formula (2), and mixtures thereof;
wherein
(i) $R_1$ is selected from the group consisting of branched and unbranched alkyl, alkylaryl, and alkenyl groups having from 4 to 30 carbon atoms, and alkyl terminated polymers of ethylene oxide, propylene oxide, and butylene oxide having a molecular weight in the range from about 200 to about 3000;
(ii) $R_2$ is selected from the group consisting of hydrogen and branched and unbranched alkyl and alkenyl groups having from 1 to 4 carbon atoms;
(iii) $M^+$ is a cation;
(iv) residues $n_1$, $n_2$, $n_3$, and $n_4$ are present in random order, and the ratio of $(n_1+n_3):(n_2+n_4)$ is from about 1:99 to about 1:1; and
(v) the molecular weight of the polyamino acid heteropolymer is from about 1,000 to about 100,000.

2. The polymerization composition according to claim 1, wherein the polymer derived from an emulsion polymerizable ethylenically unsaturated monomer is present in an amount from about 25% to about 75%, by weight.

3. The polymerization composition according to claim 1, wherein the polyamino acid heteropolymer is present in an amount from about 0.2% to about 5%, by weight.

4. The polymerization composition according to claim 1, wherein the free radical polymerization initiating agent is present in an amount from about 0.02% to about 0.5%, by weight.

5. The polymerization composition according to claim 1, wherein the polymer derived from an emulsion polymerizable ethylenically unsaturated monomer is derived from a polymerizable monomer selected from the group consisting of styrene, butadiene, vinyl acetate, methyl acrylate, methyl methacrylate, ethyl acrylate, butyl acrylate, 2-ethylhexyl acrylate, vinyl chloride, acrylonitrile, acrylamide, t-octyl acrylamide, n-vinylformamide, n-vinyl acetamide, n-vinyl pyrrolidone, di-butyl maleate, ethylene, and mixtures thereof.

6. The polymerization composition according to claim 1, wherein the free radical polymerization initiating agent is selected from the group consisting of peroxides, hydroperoxides, persulfates, and azo initiators, and mixtures thereof.

7. The polymerization composition according to claim 1, wherein $R_1$ is selected from the group consisting of branched and unbranched alkyl, alkylaryl, and alkenyl groups having from 8 to 26 carbon atoms.

8. The polymerization composition according to claim 1, wherein $M^+$ is selected from the group consisting of $H^+$, $NH_4^+$, alkali metals, alkaline earth metals, $Zn^{2+}$, $Cu^{2+}$, quaternary organic amines, and basic amino acids.

9. The polymerization composition according to claim 1, wherein the ratio of $(n_1+n_3):(n_2+n_4)$ is from about 1:50 to about 1:4.

10. The polymerization composition according to claim 1, wherein the molecular weight of the polyamino acid heteropolymer is from about 5,000 to about 60,000.

11. The polymerization composition according to claim 1, wherein the polyamino acid heteropolymer in (b) is a polyaspartic acid heteropolymer represented by Formula (1).

12. The polymerization composition according to claim 1, wherein the polyamino acid heteropolymer in (b) is a polyglutamic acid heteropolymer represented by Formula (2).

13. The polymerization composition according to claim 1, wherein the polyamino acid heteropolymer in (b) is a copolymer of the polyaspartic acid heteropolymer represented by Formula (1) with the polyglutamic acid heteropolymer represented by Formula (2).

14. A method for making a polymer which comprises polymerizing from about 10% to about 80%, by weight, of an emulsion polymerizable ethylenically unsaturated monomer in an aqueous medium by free radical initiated polymerization in the presence of:
(a) from about 0.1% to about 10% by weight of a polyamino acid heteropolymer; and
(b) from about 0.01% to about 1% by weight of a free radical polymerization initiating agent;
to form a stabilized aqueous emulsion polymerization composition, wherein the polyamino acid heteropolymer in (b) may be selected from the group consisting of polyaspartic acid heteropolymers represented by Formula (1):

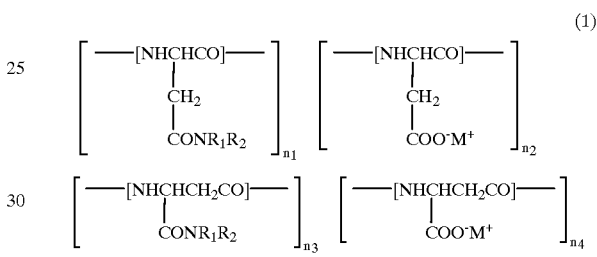

and polyglutamic acid heteropolymers represented by Formula (2):

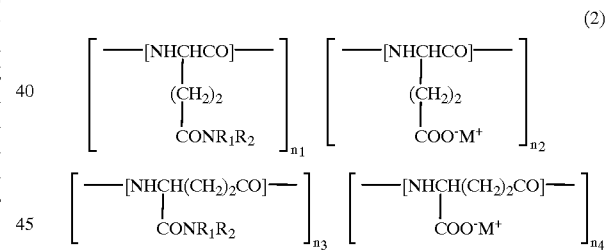

and copolymers of the polyaspartic acid heteropolymers represented by Formula (1) with the polyglutamic acid heteropolymers represented by Formula (2), and mixtures thereof;
wherein
(i) $R_1$ is selected from the group consisting of branched and unbranched alkyl, alkylaryl, and alkenyl groups having from 4 to 30 carbon atoms, and alkyl terminated polymers of ethylene oxide, propylene oxide, and butylene oxide having a molecular weight in the range from about 200 to about 3000;
(ii) $R_2$ is selected from the group consisting of hydrogen and branched and unbranched alkyl and alkenyl groups having from 1 to 4 carbon atoms;
(iii) $M^+$ is a cation;
(iv) residues $n_1$, $n_2$, $n_3$, and $n_4$ are present in random order, and the ratio of $(n_1+n_3):(n_2+n_4)$ is from about 1:99 to about 1:1; and
(v) the molecular weight of the polyamino acid heteropolymer is from about 1,000 to about 100,000.

15. The method according to claim 14, wherein the emulsion polymerizable ethylenically unsaturated monomer is present in an amount from about 25% to about 75%, by weight.

16. The method according to claim 14, wherein the polyamino acid heteropolymer is present in an amount from about 0.2% to about 5%, by weight.

17. The method according to claim 14, wherein the free radical polymerization initiating agent is present in an amount from about 0.02% to about 0.5%, by weight.

18. The method according to claim 14, wherein the emulsion polymerizable ethylenically unsaturated monomer is selected from the group consisting of styrene, butadiene, vinyl acetate, methyl acrylate, methyl methacrylate, ethyl acrylate, butyl acrylate, 2-ethylhexyl acrylate, vinyl chloride, acrylonitrile, acrylamide, t-octyl acrylamide, n-vinylformamide, n-vinyl acetamide, n-vinyl pyrrolidone, di-butyl maleate, ethylene, and mixtures thereof.

19. The method according to claim 14, wherein the free radical polymerization initiating agent is selected from the group consisting of peroxides, hydroperoxides, persulfates, and azo initiators, and mixtures thereof.

20. The method according to claim 14, wherein $R_1$ is selected from the group consisting of branched and unbranched alkyl, alkylaryl, and alkenyl groups having from 8 to 26 carbon atoms.

21. The method according to claim 14, wherein $M^+$ is selected from the group consisting of $H^+$, $NH_4^+$, alkali metals, alkaline earth metals, $Zn^{2+}$, $Cu^{2+}$, quaternary organic amines, and basic amino acids.

22. The method according to claim 14, wherein the ratio of $(n_1+n_3):(n_2+n_4)$ is from about 1:50 to about 1:4.

23. The method according to claim 14, wherein the molecular weight of the polyamino acid heteropolymer is from about 5,000 to about 60,000.

24. The method according to claim 14, wherein the polyamino acid heteropolymer in (b) is a polyaspartic acid heteropolymer represented by Formula (1).

25. The method according to claim 14, wherein the polyamino acid heteropolymer in (b) is a polyglutamic acid heteropolymer represented by Formula (2).

26. The method according to claim 14, wherein the polyamino acid heteropolymer in (b) is a copolymer of the polyaspartic acid heteropolymer represented by Formula (1) with the polyglutamic acid heteropolymer represented by Formula (2).

27. A stabilized aqueous emulsion polymerization composition prepared by a method which comprises polymerizing from about 10% to about 80%, by weight, of an emulsion polymerizable ethylenically unsaturated monomer in an aqueous medium by free radical initiated polymerization in the presence of:

(a) from about 0.1% to about 10% by weight of a polyamino acid heteropolymer; and (b) from about 0.01% to about 1% by weight of a free radical polymerization initiating agent;

to form a stabilized aqueous emulsion polymerization composition, wherein the polyamino acid heteropolymer in (b) may be selected from the group consisting of polyaspartic acid heteropolymers represented by Formula (1):

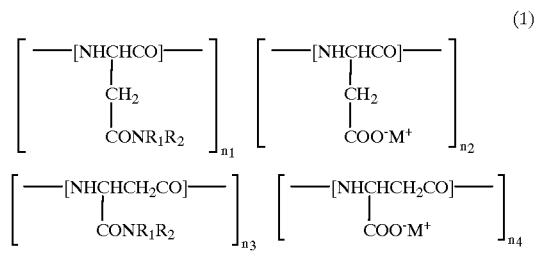

and polyglutamic acid heteropolymers represented by Formula (2):

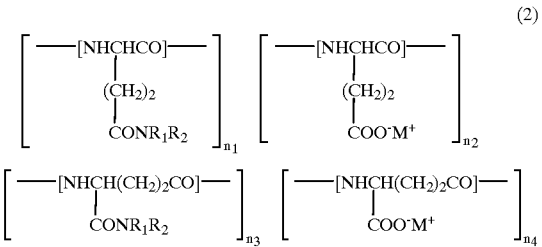

and copolymers of the polyaspartic acid heteropolymers represented by Formula (1) with the polyglutamic acid heteropolymers represented by Formula (2), and mixtures thereof;

wherein (i) $R_1$ is selected from the group consisting of branched and unbranched alkyl, alkylaryl, and alkenyl groups having from 4 to 30 carbon atoms, and alkyl terminated polymers of ethylene oxide, propylene oxide, and butylene oxide having a molecular weight in the range from about 200 to about 3000;

(ii) $R_2$ is selected from the group consisting of hydrogen and branched and unbranched alkyl and alkenyl groups having from 1 to 4 carbon atoms;

(iii) $M^+$ is a cation;

(iv) residues $n_1$, $n_2$, $n_3$, and $n_4$ are present in random order, and the ratio of $(n_1+n_3):(n_2+n_4)$ is from about 1:99 to about 1:1; and (v) the molecular weight of the polyamino acid heteropolymer is from about 1,000 to about 100,000.

* * * * *